United States Patent [19]

Glatt, Jr.

[11] Patent Number: 5,112,214
[45] Date of Patent: May 12, 1992

[54] LOCATOR RING FOR INJECTION MOLD AND COMPOSITION THEREFOR

[76] Inventor: Edward W. Glatt, Jr., 538 Crown Point Ct., Buffalo Grove, Ill. 60089

[21] Appl. No.: 668,054

[22] Filed: Mar. 12, 1991

[51] Int. Cl.$^5$ .................. B29C 45/17; B29C 45/26
[52] U.S. Cl. ................................ 425/567; 425/472
[58] Field of Search ............. 425/542, 562, 564, 565, 425/567, 568, 570, 472

[56] References Cited

U.S. PATENT DOCUMENTS 4,030,869  6/1977  Miller et al. .................. 425/568
4,909,725  3/1990  Ward ............................ 425/562

Primary Examiner—Tim Heitbrink
Attorney, Agent, or Firm—Mathew R. P. Perrone, Jr.

[57] ABSTRACT

A device to position a mold is shaped like a doughnut having a tapered edge with four standardly positioned holes to fit a standard mold. The apertures in the mold having a narrow portion in the thick portion and a wider portion in the tapered portion of the ring. The ring material has lubricated 6/10 style of nylon having glass fiber loading, a type 6 nylon high impact modified nylon, a type 66 nylon which is mineral filled, a acrylonitrile butadiene styrene copolymer, a chemical blowing agent and a wax slipping agent.

6 Claims, 2 Drawing Sheets

LOCATOR RING FOR INJECTION MOLD AND COMPOSITION THEREFOR

The invention relates to a locater ring for injection molding, and more particularly to a foamed nylon polymer locater ring for injection molds capable of indicating when the mold is properly in place.

BACKGROUND OF THE INVENTION

An injection molding machine includes a press plate and a clamp to hold the mold surface in proper position for injecting the desired material therein. A highly critical feature in this matter is the correct placement of the mold. It is standard knowledge in the injection molding industry to position the mold and clamp it in position.

The positioning is known to be guided by the positioning of metal wear rings or other guiding devices. In the event that the mold is improperly positioned, the metal wear ring can be destroyed. Also the ridge on the mold which permits the positioning in the plate, is easily destroyed when the mold is improperly positioned. It is desired to develop a suitable locater ring for positioning the mold.

Damage during the set up stage of an injection mold occurs when a misaligned mold closes. The hot rolled steel locater rings currently used require not only a lot of energy and expense to cut and finish, but such a locater ring is unforgiving. When the platen of the mold goes off the location, an operator seldom knows when anything is wrong until the sound of steel being crushed is heard.

Once damaged, the die platen is not serviced easily. Removing and remachining thereof is required. But removing and remachining can compromise the strength and structure of the platen. Also the damaged tool for the mold can prove very costly to repair.

Polymer waste provides another. It is sometimes difficult to use waste polymers. It is highly desired to reuse or recycle waste polymers.

It is difficult to prepare a polymer locater ring having sufficient strength to assist in locating, while at the same time avoiding such a waste of petroleum resources. Yet if a suitable locater ring can be manufactured, great advantages can be obtained.

SUMMARY OF THE INVENTION

Therefore, it is an objective of this invention to provide a locater ring for an injection mold.

A further objective of this invention is to provide a composition suitable for forming a locater ring for an injection mold.

A still further objective of this invention is to provide a locater ring which minimizes damage to a mold plate.

Yet a further objective of the invention is to provide a locater ring to avoid the use of a metal wear ring.

Also an objective of this invention is to provide a locater ring to minimize damage to a mold clamp.

Another objective of this invention to provide a locater ring to minimize damage to a metal wear ring.

Still another objective of this invention to provide a locater ring to minimize damage to the mold platen.

Yet another objective of this invention to provide a locater ring to minimize damage to the mold platen.

A further objective of this invention is to provide a suitable polymer composition to form a locater ring for an injection mold.

A still further objective of this invention is to provide a locater ring which minimizes waste of petroleum materials.

These and other objectives of the invention (which other objectives become clear by consideration of the specification, claims and drawings as whole) are met by providing a locater ring formed of foamed and filled nylon polymer mixture.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

A device to position a mold is comprised of a donut shaped ring having a tapered edge with four standardly positioned holes to fit a standard mold. The apertures in the mold have a narrow portion in the thick portion and a wider portion in the tapered portion of the ring. The ring material has a substantial portion of recycled polymers—especially nylon polymer.

Due to the standard factors of the mold and the requirements of the molding industry, one size of locater ring is usable in all situations. However, it is clear that the mold locater ring can be adjusted in size as desired.

Figure 1:
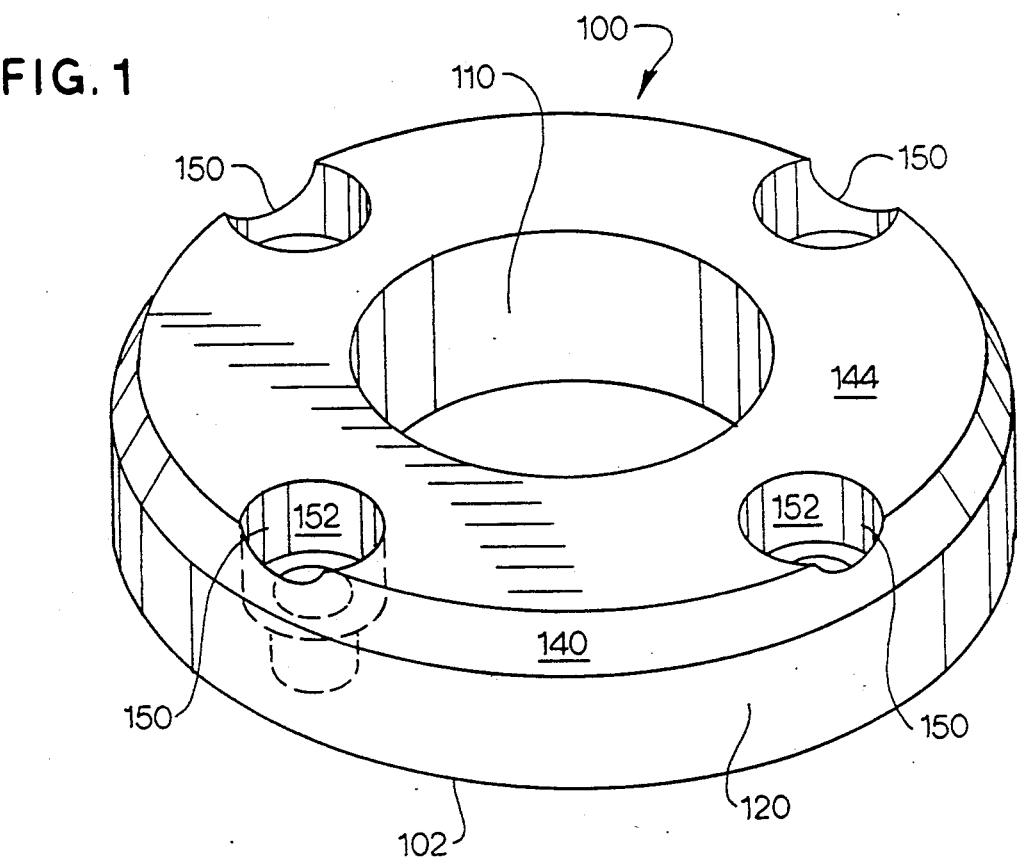
FIG. 1 depicts a top, perspective view of the locater ring 100 of this invention.
Figure 2:
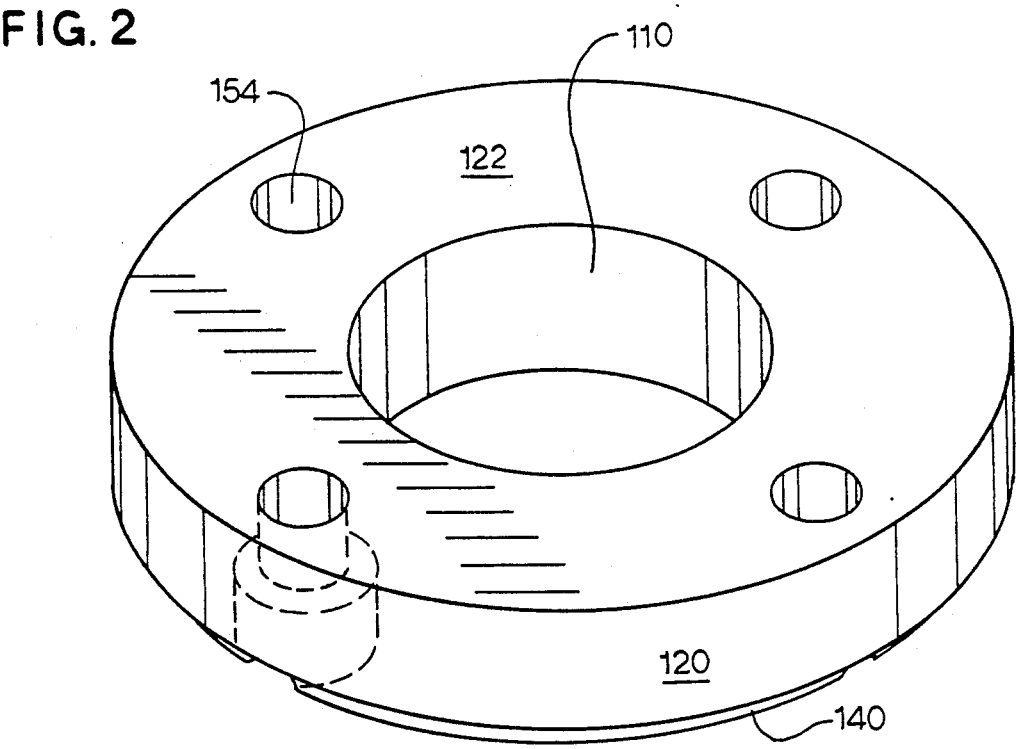
FIG. 2 depicts a bottom, perspective view of the locater ring 100 of this invention.
Figure 3:
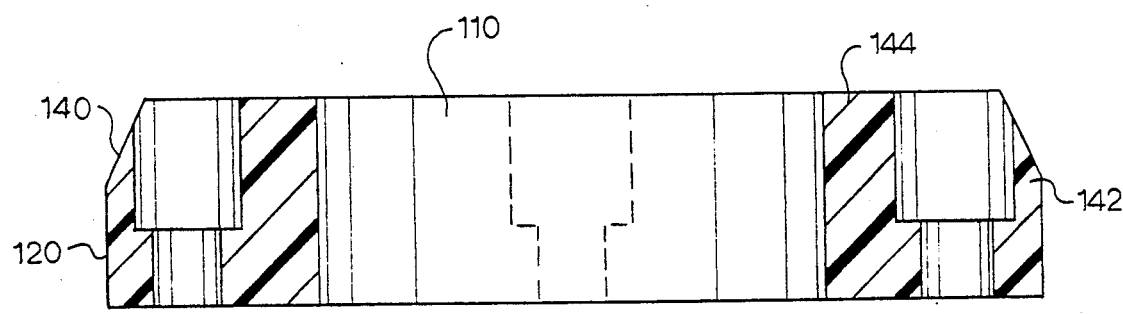
FIG. 3, depicts a side, cross-sectional view of a locater ring 100.

Current molding industry standards require as shown in FIG. 1, FIG. 2 and FIG. 3 show that that the mold locater ring 100 has a cylindrical section 120 leading into a tapered portion 140. Tapered portion 140 has a trapezoidal cross section due to its truncated conical shape, with its large base 142 adjacent cylindrical section and its smaller base 144 oppositely disposed therefrom as part of the outer surface 102 of locater ring 100. Ring aperture 110 is centrally located in locater ring 100 and passes entirely therethrough including cylindrical section 120 and tapered portion 140.

Radially positioned on locater ring 100, are four bolting apertures 150. Each bolting aperture 150 has a step cylindrical cross-section due to drilling and counter boring, thereby by forming a head portion 152 and base portion 154. The axis of each bolting aperture 150 is parallel to the axis of ring aperture 110. Head portion 152 passes through tapered portion and partially into cylindrical section 120. Base portion 154 continues therefrom to complete bolting aperture 150. Head portion 152 has a larger diameter than base portion 154.

Locater ring 100 is secured to a mold (not shown) so that cylinder base 122 is adjacent the mold. Bolts (not shown) pass through each bolting aperture 150 at head portion 152 into base portion 154 and the mold. Thus smaller base 144 contacts the mold platten (not shown). Upon securing of the mold against the platten, a properly placed mold fits. An improperly placed mold ruptures ring locater 100 with a noise loud enough to stop the securing of the mold before damage is done to the platten.

Tapered portion 140 forms an angle with cylindrical section 120. Preferably the angle is up to forty five (45°) degrees. More preferably the angle is five (5°) to forty (40°) degrees. Most preferably the angle is ten (10°) to thirty (30°) degrees.

With current standard factors in the molding industry, it is desired that the mold locater ring have an inside diameter of slightly less than about 5.05 centimeter (two inches). It is furthermore desired that the thickness of the mold locater ring be about 1.86 centimeters (0.735 inch). The cylindrical section should be about 1.23 centimeters (0.485 inches) thick, whereas the tapered portion (having a generally trapezoidal side view) should be about 0.63 centimeter (0.250 inch) thick. The mold locater ring has an outside diameter of about 10.14 centimeters (3.990 inches).

It is very suitable to make this ring out of recycled nylon. The recycled nylon is generally a 66 nylon fiberglass filled mold locater ring in combination with a fiber containing nylon.

The mold locater ring 100 disclosed and claimed herein has a microcellular structure, which is forgiving on a misaligned mold. If the mold is misaligned, highly audible cracking sounds in the ring 100 can alert an operator before any damage is done to either the mold or the platen. The locater ring 100 of this invention allows for quicker mold setups, form fits a mold to a worn platen and prevents electrical shorting. This particular mold locater ring 100 does not stick to hot thermoplastic materials. The mold locater ring 100 is economical to produce also.

It is very suitable to make this ring 100 out of recycled nylon. The recycled nylon is generally a 66 nylon fiberglass filled polymer in combination with a fiber containing, impact modified nylon. The impact modified nylon is from carpeting material, which provides for good recycling.

The composition for the locater ring 100 of this invention; in addition to a heat stabilized, lubricated 6/10 style of nylon having glass fiber loading and a type 6 high impact modified nylon; generally includes a type 66 nylon which is mineral filled, a acrylonitrile butadiene styrene copolymer, a chemical blowing agent and a wax slipping agent.

Generally speaking, the heat stabilized nylon contains a short fiber filler. Preferably the fiber is glass fiber. And preferably this 6/10 nylon contains up to about 50% fiber.

The type 6 nylon is preferably recycled nylon carpet fiber. One source of this ingredient is commonly available under the name PTP 7950 from Allied Capron Company. A preferred heat stabilized lubricated nylon is available from E. I. DuPont deNemours, of Wilmington, Del. under the trademark Zytel. The 6/6 mineral filled nylon is a common industrial ingredient. Typically, this composition can be purchased also from DuPont of Wilmington, Del. under the trademark Minlon.

The acrylonitrile butadiene styrene as preferred is commonly known as telephone grade is suitable for use in making of telephones. This tripolymer provides the desired high impact strength to the locater ring 100. This material is generally available from Borg-Warner Company of Chicago, Illinois.

It is desirable to have a blowing agent to provide for a foamed locater ring 100. The foaming provides for an addition to the crushing noise indicating the improper position of the mold. Typically the blowing agent is any suitable blowing agent used in polymers. A typical blowing agent is available from OLPN Owen Chemicals under the trademark Chemtek 500 or from ICI America of Exton, Pa., under the name Foam Kon 2B.

When the wax additive is present, a slip agent is provided and the plastic being molded does not adhere to the locater ring 100. This wax agent is available under the trade name Acrawax either from Lonza of Columbia, S.C. or Cardinal Chemical.

It is also possible to substitute a fiber-filled poly carbonate and make locater ring 100 thereof. The fiber content thereof is twenty to fifty percent by weight of the carbonate or other resin.

The components of the locater ring 100 are generally selected to form a locater ring 100 having a tensile strength of 1,000 to 2,000 kilograms per square centimeter at 20 to 25 degrees Centigrade (16,000 to 17,000 pounds per square inch at 73 degrees Fahrenheit), a flexural strength of 1,500 to 1,800 kilograms per square centimeter (22,500 to 23,500 pounds per square inch), a compressive strength of 1,300 to 9,000 kilograms per square centimeter (20,500 to 21,500 pounds per square inch) and a shear strength of 600 to 700 kilograms per square centimeter (9,000 to 10,000 pounds per square inch).

In the composition used to form the locater ring 100, the heat stabilized lubricated nylon is generally present in the amount of 5 to 75 percent by weight of the composition. The impact modified nylon is generally present in the amount of 5 to 75 percent by weight of the composition. The mineral filled nylon is generally present in the amount of 5 to 50 percent by weight of the composition. The coloring agent is generally present in the amount of 0 to 10 percent by weight of the composition. The acrylonitrile/butadiene/styrene is generally present in the amount 0 to 25 percent by weight of the composition. Blowing agent is generally present in the amount of up to 5 percent by weight of the composition. The wax agent is generally present in the amount of up to 10 percent by weight of the composition.

More preferably, in the composition used to form the locater ring 100, the heat stabilized lubricated nylon is generally present in the amount of 10 to 70 percent by weight of the composition. The impact modified nylon is generally present in the amount of 10 to 70 percent by weight of the composition. The mineral filled nylon is generally present in the amount of 10 to 45 percent by weight of the composition. The coloring agent is generally present in the amount of 0.1 to 9 percent by weight of the composition. The acrylonitrile/butadiene/styrene is generally present in the amount 1 to 20 percent by weight of the composition. Blowing agent is generally present in the amount of up to 4 percent by weight of the composition. The wax agent is generally present in the amount of up to 9 percent by weight of the composition.

Most preferably, in the composition used to form the locater ring 100, the heat stabilized lubricated nylon is generally present in the amount of 15 to 50 percent by weight of the composition. The impact modified nylon is generally present in the amount of 15 to 50 percent by weight of the composition. The mineral filled nylon is generally present in the amount of 15 to 35 percent by weight of the composition. The coloring agent is generally present in the amount of 0.5 to 5 percent by weight of the composition. The acrylonitrile/butadiene/styrene is generally present in the amount 5 to 15 percent by weight of the composition. Blowing agent is generally present in the amount of up to 3 percent by weight of the composition. The wax agent is generally present in the amount of up to 7 percent by weight of the composition.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modifications of this method and apparatus can become clear to a person having ordinary skill in this particular art. Such modifications are clearly covered by this disclosure.

What is claimed and sought to be protected by Letters Patent of the United States is:

1. A locater ring for assisting in a placement of a mold in an injection molding device wherein:
   a. said locater ring is formed from a composition comprising a nylon resin mixture;
   b. said nylon resin mixture including a high impact nylon, and a heat stabilized and lubricated nylon;
   c. said locater ring being donut shaped with a top tapered edge and a bottom cylindrical portion; and
   d. said locater ring including a mold securing means for allowing attachment of said locater ring to said mold.

2. The locater ring of claim 1 wherein:
   a. said securing means includes four, radially perpendicular, bolting apertures;
   b. said mold locater ring having a cylindrical section leading into a tapered portion;
   c. said tapered portion having a trapezoidal cross section due to a truncated conical shape; and
   d. said trapezoidal cross section having a first base and a second base oppositely disposed from said first base;
   e. said first base being larger than said second base; and
   f. said first base being adjacent to said cylindrical section.

3. The locater ring of claim 2 wherein:
   a. said locater ring includes a ring aperture centrally located therein and passing entirely therethrough;
   b. each of said four bolting apertures having a stepped cylindrical cross-section;
   c. said step cylindrical cross-section having a head portion and a base portion;
   d. said head portion being located in said tapered portion;
   e. said base portion being located in said cylindrical section; and
   f. said head portion having a larger diameter than said base portion.

4. A locater ring for assisting in a placement of a mold in an injection molding device wherein:
   a. said locater ring is formed from a composition comprising a nylon resin mixture;
   b. said nylon resin mixture including a high impact nylon, and a heat stabilized and lubricated nylon;
   c. said high impact nylon comprising about 5 to about 75 percent by weight of the composition;
   d. said heat stabilized and lubricated nylon comprising about 5to about 75 percent by weight of the composition;
   e. a mineral filled nylon being present in the amount of 5 to 50 percent by weight of the composition;
   f. a coloring agent being present in the amount of 0 to 10 percent by weight of the composition;
   g. an acrylonitrile/butadiene/styrene copolymer being present in the amount 0 to 25 percent by weight of the composition;
   h. a blowing agent being present in the amount of up to 5 percent by weight of the composition; and
   i. a wax agent being present in the amount of up to 10 percent by weight of the composition.

5. The locater ring of claim 4, wherein:
   a. said locater ring has a tensile strength of 1,000 to 2,000 kilograms per square centimeter at 20 to 25 degrees Centigrade;
   b. said locater ring having a flexural strength of 1,500 to 1,800 kilograms per square centimeter;
   c. said locater ring having a compressive strength of 1,300 to 9,000 kilograms per square centimeter; and
   d. said locater ring having a shear strength of 600 to 700 kilograms per square centimeter.

6. A locater ring for assisting in the placement of a mold in an injection molding device wherein:
   a. said locater ring is formed from a composition comprising a fiber filled polycarbonate resin;
   b. said locater ring having a tensile strength of 1,000 to 2,000 kilograms per square centimeter at 20 to 25 degrees Centigrade;
   c. said locater ring having a flexural strength of 1,500 to 1,800 kilograms per square centimeter;
   d. said locater ring having a compressive strength of 1,300 to 9,000 kilograms per square centimeter; and
   e. said locater ring having a shear strength of 600 to 700 kilograms per square centimeter.

* * * * *